H. R. WALTON & J. H. JOHNSON.
DIRIGIBLE HEADLIGHT.
APPLICATION FILED FEB. 5, 1916.
1,200,279.              Patented Oct. 3, 1916.
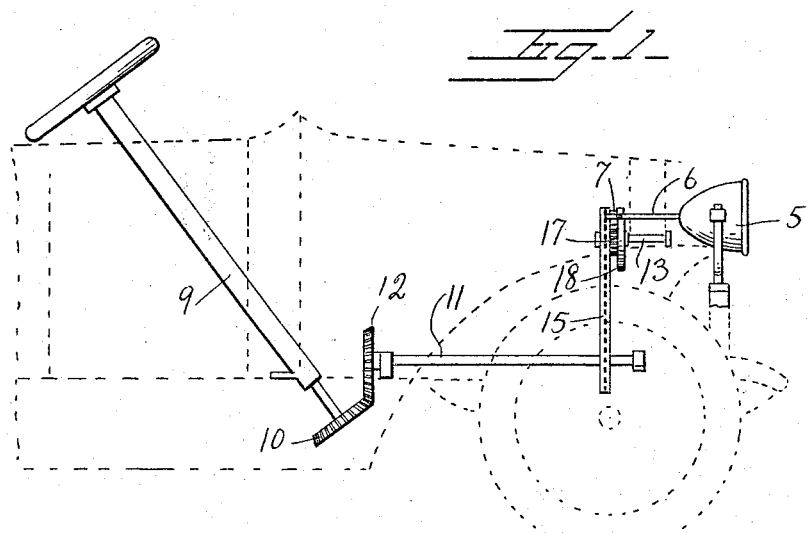
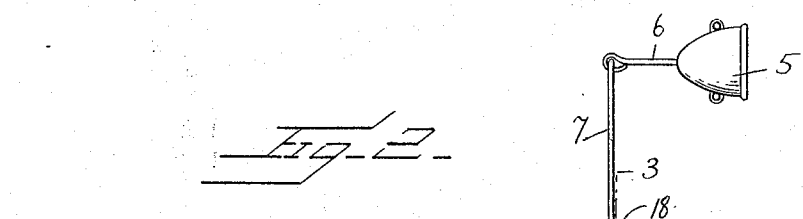
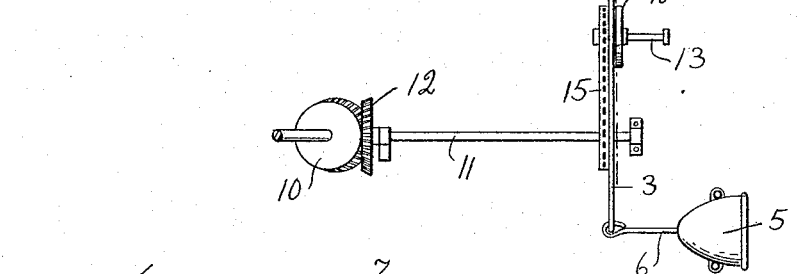
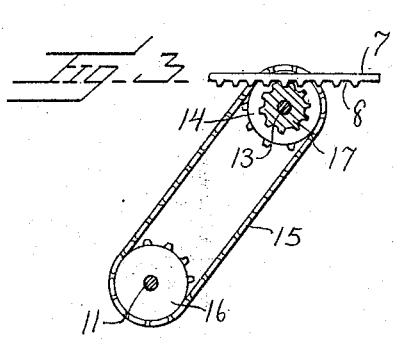
Inventors
H. R. WALTON and
J. H. JOHNSON
By Watson E. Coleman
Attorney

UNITED STATES PATENT OFFICE.

HAROLD R. WALTON AND JOHN H. JOHNSON, OF REW, PENNSYLVANIA, ASSIGNORS OF ONE-THIRD TO EGBERT D. OSTRANDER, OF CERES, PENNSYLVANIA.

DIRIGIBLE HEADLIGHT.

1,200,279.          Specification of Letters Patent.          Patented Oct. 3, 1916.

Application filed February 5, 1916. Serial No. 76,407.

*To all whom it may concern:*

Be it known that we, HAROLD R. WALTON and JOHN H. JOHNSON, citizens of the United States, residing at Rew, in the county of McKean and State of Pennsylvania, have invented certain new and useful Improvements in Dirigible Headlights, of which the following is a specification, reference being had to the accompanying drawings.

This invention relates to an improved dirigible headlight and has for its primary object to provide simple and positively operating means for turning the headlights in accordance with the direction of travel of the machine when the steering wheel is operated.

It is another and more particular object of the invention to provide arms extending rearwardly from the headlights which are mounted in the usual manner upon swiveled brackets, a rack bar connecting said arms, a shaft geared to the steering shaft, a cog gear meshing with the rack, and a chain and sprocket connection between said gear and said longitudinal shaft.

It is a further object of our invention to provide a device for the above purpose which is exceedingly simple and inexpensive in its construction and may be readily applied to the ordinary motor vehicle without necessitating any material alterations therein.

With the above and other objects in view, our invention consists in the novel features of construction, combination and arrangement of parts to be hereinafter more fully described, claimed and illustrated in the accompanying drawing, in which, Figure 1 is a side elevation showing our improved headlight operating mechanism applied to a motor vehicle; Fig. 2 is a top plan view; and Fig. 3 is a section taken on the line 3—3 of Fig. 2.

Referring in detail to the drawing, 5 designates the headlights of a motor vehicle which are mounted in the usual yokes or brackets swiveled in any approved manner upon opposite sides of the machine body at its forward end. Each of the headlights is provided with a rearwardly extending arm 6 and to these arms, the ends of a transverse rack bar 7 are operatively connected, the rack teeth 8 being on the lower edge of said bar. It is understood, of course, that the connection between the ends of the bar 7 and the arm 6 is sufficiently loose to permit of the necessary play or lost motion in the shifting movement of the rack bar, whereby the lamps may be turned in the brackets.

9 designates the steering post and, to the steering shaft mounted in said post on the lower end thereof, a gear wheel 10 is fixed. A similar gear wheel 12 is secured to the rear end of the longitudinally extending shaft 11 and meshes with the gear wheel 10. This shaft 11 is journaled in suitable bearings mounted upon the frame of the machine, the forward end of said shaft being journaled in a bearing on the radiator casing.

A relatively short longitudinal shaft 13 is rotatably mounted upon the rear end of the radiator casing and above the shaft 11, and to this shaft 13, a sprocket wheel 14 is fixed, said sprocket wheel being connected by means of a chain 15 to a sprocket wheel 16 on the shaft 11. A gear 17 is formed upon one face of the sprocket wheel 14 and is provided with an outwardly extending flange 18 of approximately the same diameter as the sprocket wheel 14. The rack bar 7 is disposed between this flange and the opposed face of the sprocket wheel and is held thereby in constant engagement with the teeth of the gear 17.

From the above description, the construction and manner of operation of the device will be readily understood. When the operator rotates the steering wheel, the gear 10 fixed to the lower end of the steering shaft meshing with the gear 12, imparts rotation to the shaft 11. This shaft, through the sprocket chain 15, in turn rotates the shaft 13 and the gear 17, thus shifting the rack bar 7 transversely and thereby turning the lamps 5 upon their supports, and in the same direction as the front wheels of the machine are turned in the steering of the vehicle. Thus, the light rays are at all times thrown directly ahead of the machine and liability of accidents thus reduced to a minimum.

It will be seen from the above that the device as a whole is very simple, not liable to get out of order, and may be readily applied to the ordinary motor vehicle at nominal expense.

While we have shown and described the preferred construction and arrangement of the several parts, it is to be understood that the device is susceptible of considerable modification therein and we, therefore, reserve the privilege of adopting all such legitimate changes as may be fairly embodied within the spirit and scope of the invention as claimed.

Having thus fully described our invention, what we desire to claim and secure by Letters Patent is:—

1. The combination with the swiveled headlights of a motor vehicle each having a rearwardly extending arm, a transverse rack bar connecting said arms, of a longitudinally disposed shaft, gearing connecting said shaft to the steering shaft of the vehicle, a rotatably mounted gear meshing with said rack and provided with a sprocket, a sprocket fixed to said shaft, and a power transmitting chain connecting said sprockets to rotate the gear when the steering shaft is turned and shift said rack bar transversely whereby the headlights are turned in the direction of movement of the vehicle.

2. The combination with the headlights of a motor vehicle each having a rearwardly extending arm, a transverse rack bar connecting the rear ends of said arms, of a longitudinally disposed shaft geared to the steering shaft of the vehicle, a second longitudinal shaft, a sprocket fixed thereon having a gear on one side meshing with said rack, an annular flange projecting outwardly beyond the gear teeth, said rack bar being disposed between the sprocket and said flange and held in engagement with the gear teeth thereby, and a power transmitting chain connecting said sprocket to the sprocket on said longitudinal shaft whereby the rack is shifted transversely when the steering shaft is turned and the headlights turned in the direction of travel of the vehicle.

In testimony whereof we hereunto affix our signatures in the presence of two witnesses.

HAROLD R. WALTON.
JOHN H. JOHNSON.

Witnesses:
W. J. MILLIKEN,
FRANK L. WALTER.

Copies of this patent may be obtained for five cents each, by addressing the "Commissioner of Patents, Washington, D. C."